United States Patent [19]

Garceà

[11] 4,265,205
[45] May 5, 1981

[54] CONTROLLED-IGNITION I.C. ENGINE WITH THERMAL DETECTION SYSTEM

[75] Inventor: Giampaolo Garceà, Milan, Italy

[73] Assignee: Alfa Romeo S.p.A., Milan, Italy

[21] Appl. No.: 62,482

[22] Filed: Jul. 31, 1979

[30] Foreign Application Priority Data

Aug. 11, 1978 [IT] Italy .................. 26740 A/78

[51] Int. Cl.³ .................................... F02P 5/14
[52] U.S. Cl. .............................. 123/425; 73/35
[58] Field of Search .......... 123/117 R, 117 D, 148 E, 123/32 EE, 146.5 A; 73/35, 346

[56] References Cited

U.S. PATENT DOCUMENTS

| | | | |
|---|---|---|---|
| 2,660,883 | 12/1953 | Wyczalek | 73/35 |
| 3,939,711 | 2/1976 | Hanaoka | 73/346 |
| 3,983,754 | 10/1976 | Deguchi et al. | 73/346 |
| 4,061,116 | 12/1977 | Saida et al. | 123/146.5 A |
| 4,063,538 | 12/1977 | Powell et al. | 123/146.5 A |
| 4,114,442 | 9/1978 | Pratt | 73/346 |
| 4,133,475 | 1/1979 | Harned et al. | 73/35 |

*Primary Examiner*—Charles J. Myhre
*Assistant Examiner*—R. A. Nelli
*Attorney, Agent, or Firm*—Charles E. Brown

[57] ABSTRACT

In an internal combustion engine in which overheating phenomena in the explosion chamber are to be monitored and prevented, a temperature sensor is arranged in the region far from the sparking plug to send signals to a governing electronic circuitry which is arranged for modifying the ignition advance responsively to abnormal situations and for restoring normal running conditions as soon as the disturbing phenomena have ceased to occur.

7 Claims, 2 Drawing Figures

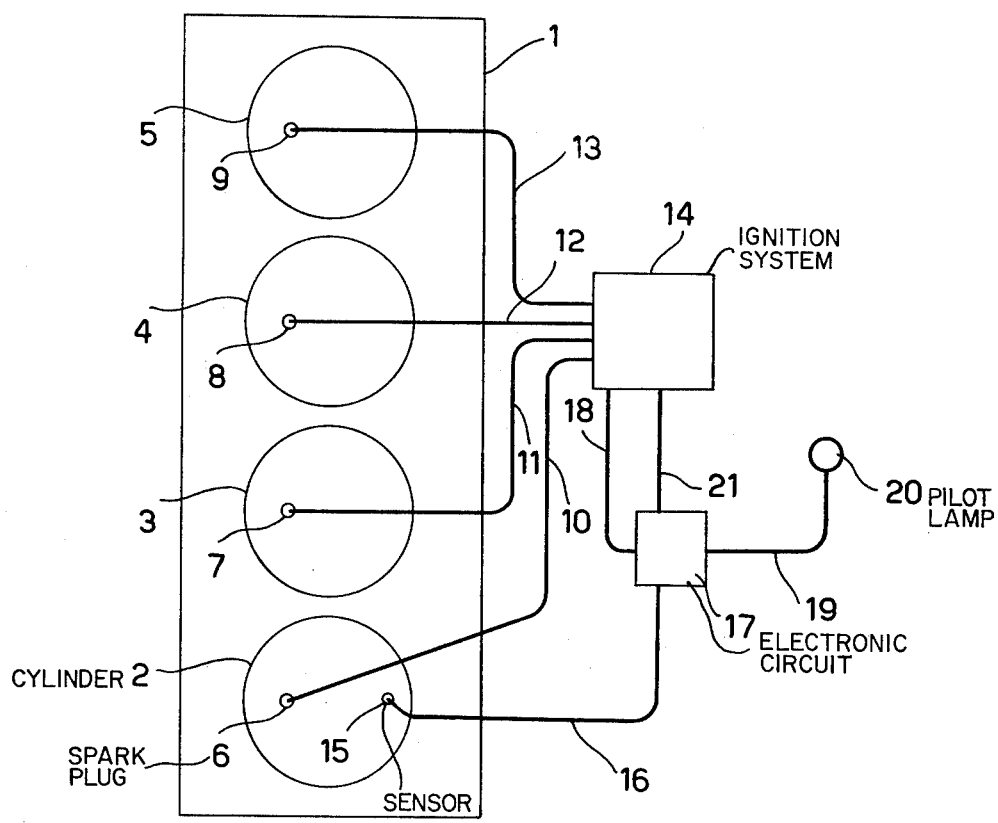
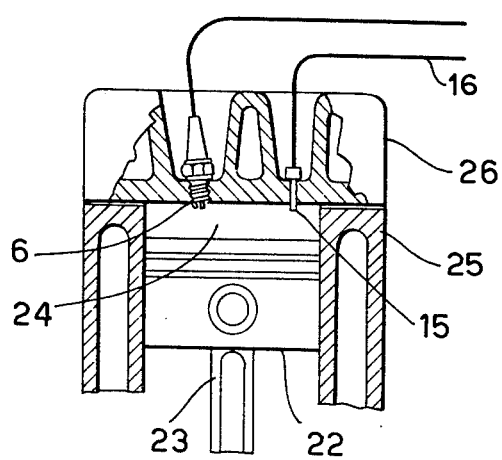

CONTROLLED-IGNITION I.C. ENGINE WITH THERMAL DETECTION SYSTEM

In the conventional controlled-ignition internal combustion engines, the mechanical component parts which in operation are heated to the highest temperatures and are thus more stressed thermally than others are those which are contacted by the exhaust gases in the interior of the explosion chambers. If, for any of these component parts, the thermal stress exceeds certain determined threshold values, the failure of that particular component part originates the failure and the stoppage of the whole engine with resultant lenghty and expensive repair operations. It is justified, to a degree, that the manufacturer is concerned in that such threshold values are never exceeded even in the case that, both in the production run and in operation, the negative situations involving an increase of the thermal stresses aforesaid may occur. The provision that the manufacture is compelled to adopt are generally detrimental from another standpoint: in this connection it suffices to mention that the performance and the fuel economy are essentially a function of the thermodynamic efficiency of the thermal cycle, and this factor is the higher, the higher is the maximum temperature of such a cycle. Such provisions generally consist just in reducing this maximum temperature.

Thus, the widest is the safety margin that the manufacturer deems necessary under consideration of the chances that such negative siutation may occur, and also that they may occur all simultaneously, the higher is the price to be paid for the performances and the economy of fuel of the engine.

It is appropriate to recall in this connection that in the controlled-ignition engines, the efficiency and the temperatures of the cycle (and thus also the temperatures of the mechanical component parts aforementioned) are increased as the ignition advance is increased, up to a value of the latter to which the maximum efficiency corresponds. Beyond said value, the temperature continues to be raised while the efficiency becomes poorer. It is apparent that the engine is caused to run in the field of ignition advance below that of maximum efficiency and up to said value. If with the maximum-efficiency advance the temperatures of the mechanical component parts aforesaid are exceedingly high or may so become is the negative situations aforementioned occur, the above mentioned safety margin will consist of the difference between the optimum advance and the advance which has been adopted.

The foregoing holds good in the hypothesis that ignition and combustion of the mixture in the explosion chamber take place regularly, so that the safety margin should take into account only the fact that on the engines being produced and in the running engines, the actual advance may diverge even considerably from the one which has been prescribed, due to the accumulation of construction allowances, regulations, and subsequent drift of the adjustments in operation. But the margin of adjustment shall be further widened to take into account other two possible events, viz.: "preignition" due to the fact that the presence of a hot spot in the explosion chamber (generally the insulated electrode of the spark plug) may cause a premature ignition as compared with the forecast ignition and thus those further overheatings of the aforementioned mechanical component parts which are a consequence of the increase of the ignition advance, and "knock" by which a portion of the still unburned mixture burns all simultaneously and not due to a gradual advance of a flame front. In view of the foregoing a high advance makes more probable the occurrence of a possible hot spot which may cause preignition and makes more likely the overheating of the compressed mixture which originates knock. To prevent those two phenomena, both detrimental to the engine life, the above mentioned safety margin will have to be farther widened, that is, the advance shall be still more reduced relative to the optimum one for performance and fuel consumption. It will be necessary to take into account the fact that, for example, preignition depends also on the tolerances in the thermal rating of the plug and the deposits formed during the engine run within the explosion chamber, and that knock depends also on the tolerances in the value of the compression ratio in the mass-produced engines, but especially on the properties of the commercially available fuels.

An object of the device of the present invention is to prevent as far as practicable the decreases undergone by the engine as to performances and fuel consumption as a result of the above mentioned necessity of adopting considerable margins of safety for the integrity of the abovementioned mechanical component parts which are more intensely stressed by heat. Such a device, in fact, makes it possible to dispense with safety margins and thus makes it possible to adopt just the ignition advance which involves an optimization of power and consumption. This is a result of the fact that, when in operation the negative situations in question occur, a sensor prearranged in the explosion chamber of at least one cylinder, is capable of signalling that the temperature of such thermally stressed component parts is about to exceed the dangerous threshold value as to their integrity and that of the engine. In order for the sensor to be adapted to fulfil this requirement, and for the signals to be really indicative of the overheating phenomena of the mechanical component parts in connection also with the various situations enumerated above, both the position of the sensor and its design must accurately be studied. As regards positioning, it has been considered that, while an exceeding high angle of advance or a preignition give rise to overheating which is generalized to all the points of the explosion chamber throughout, knock, conversely, overheats a comparatively restricted area of the chamber: in this area the incipient knock occurs initially and the phenomenon is particularly strong when the knock is considerably intense and is just in that zone that the surfaces of the mechanical component parts such as the engine head, the piston and the gasket, are prone to damage, as knock occurs. This zone is the one in which the mixture burns last and thus the one farthest from the plug, as a rule. It is just in that zone that the sensor has been positioned in order that also the knock phenomenon may be monitored.

As regards the design it has been thought advisable that it was bound to the wall of the engine head which encloses the explosion chamber, with a thermal conductivity which is sufficiently reduced relative to said wall, the temperature of the latter being generally moderate since in contact with the engine coolant. By so doing, the temperature which is normally taken by the sensor is considerably lower than that which would cause a preignition due to a hot spot, but it must, however, be comparatively high because the magnitude of the increase of temperature which must take place in the case of an abnormal situation (that is one which is dangerous for the integrity of the components aforementioned) and thus the magnitude of the "signal", is generally proportional to the value of said temperature as normally taken by the sensor. The design of the sensor, moreover, must be such as to have a very reduced thermal inertia to encourage the promptness of the signal but also in order for the sensor to be able to feel all those increases of the heat transfer which, in the thermal cycle, have a very short duration as is the case, for example, when knock occurs, so that the overtaking of the same threshold value of the sensor temperature may be, as far as practicable, an index of equally dangerous situations both in the case of ignition and combustion otherwise normal and in the case of preignition or knock.

Two different modes of use are provided for the device described above. The first, which is the simplest and the cheapest, is very valuable at any rate, and provides that the signal coming from the sensor be continually delivered to an electronic circuit in which appropriate means, consisting of a threshold comparing circuitry, evaluate the signal and in the case that it exceeds the value corresponding to the threshold temperature aforesaid, command the actuation of an alarm for the vehicle driver. Said alarm can be, for example, a pilot lamp arranged in the dashboard before the driver's seat so that the driver can reduce the engine power until the alarm signal fades away. The second possibility of use, also a part of this invention, provides likewise that the signal coming from the sensor is sent continually to an electronic circuitry consisting of a threshold comparator and thus capable of evaluating the signal as an index of the threshold temperature having been overtaken, with such electronic circuitry is connected with the engine ignition system. The latter system delivers the electricity which is required for the plug discharge with a particular adjustment of it own for the basic ignition advance as a function of at least one of the characteristic parameters of the employment of the engine.

Through said connection, the electronic circuit, in the case in which the signal coming from the sensor exceeds the threshold value, command a reduction of the ignition advance relative to that corresponding to the basic adjustment, so as to restore the signal below the threshold value aforesaid.

IN THE DRAWINGS:

FIG. 1 is a schematic view of an internal combustion engine incorporating the invention.

FIG. 2 is an enlarged fragmentary sectional view through the upper part of the cylinder having the sensor therein transversely of the engine axis.

In order that the foregoing may better be elucidated, in FIG. 1 there are indicated diagrammatically the engine 1 (for example this is an in-line 4-cylinder engine) as viewed along the direction of the cylinder axis; the cylinders 2, 3, 4 and 5; the sparking plugs 6, 7, 8 and 9 of such cylinders, the ignition cables 10, 11, 12 and 13 which convey the ignition current to the plugs. The ignition system which delivers the current to the plugs with a preselected adjustment of the ignition advance relative to the upper dead center of the pistons in the several cylinders is generally identified by the numeral 14 and the temperature sensor by the numeral 15, which sensor is arranged in the interior of the explosion chamber of the cylinder 2, in the zone in which the knock phenomenon first occurs, which is generally in the zone farthest from the plug 6. A lead 16 is provided (if the sensor is a thermocouple, the lead contains the two conductors starting from the hot joint of the thermocouple) for connecting the sensor 15 with an electronic circuitry 17 comprising a threshold comparator capable of evaluating, on the basis of the magnitude of the signal coming thereto from the sensor 15, if the temperature of the sensor is below or above a preselected threshold value, which can either be constant or variable according to a preselected law of variation as a function of the engine RPM and thus can be calculated by the electronic circuit 17 on the basis of the frequency of the ignitions which is signalled to the electronic circuit 17 by the ignition system 14 via the connection 18. In a first version of the device in the case in which the electronic circuit feels that the temperature of the sensor 15 is above the preselected threshold value, the electronic circuit as such commands by means of the connection 19 the lighting up of a pilot lamp 20, for example positioned on the dashboard before the driver's seat. In a second version of the device, when the temperature of the sensor 15 exceeds the threshold value which has been preselected, the electronic circuit, via the connection 21 sends a command to the ignition system 14 for a quick and gradual reduction of the ignition advance relative to the values which correspond to the basic adjustment of the system 14.

In this second version of the device, the electronic circuit 17 is fitted also with means for discontinuing the quick reduction of the ignition advance as soon as the temperature of the sensor 15 drops below a second threshold value which can either be equal to, or lower than, said preselected threshold value aforesaid. The electronic circuit 17 may have also means which, as the command for the quick reduction of the ignition advance, command a less quick gradual increase of the ignition advance to restore it towards the values of the basic regulation.

This temporary correction of the ignition advance relative to the basic regulation may be effected along the entire ignition pilot and thus in the entire field of operation of the engine, or only in a few zones of such field.

It is apparent that, in addition to the cylinder 2 other cylinders, and in limiting conditions all of them, can be equipped with sensors similar to that shown at 15, said sensors being equally connected with the electronic circuit 17, said circuit taking into account also the corresponding signals to enter action if and when necessary by commanding the lighting up of the pilot lamp 20 or the reduction of the ignition advance.

In 2, there is indicated the piston 22 and the connecting rod 23, both in the position corresponding to the upper dead center position. The explosion chamber into which the plug 6 and the sensor 15 protrude is identified by the numeral 24 and the cylinder block is identified by the numeral 25 while the engine head is identified by the numeral 26.

I claim:

1. A device for checking the overheating phenomena in the interior of the explosion chamber of an internal combustion engine of the controlled-ignition type and equipped with an ignition system for producing an electric discharge at a sparking plug of a cylinder relative to the upper dead center of a respective piston, said device comprising a temperature sensor in the interior of the explosion chamber of at least one of the engine cylinders, said sensor being positioned for contact with exhaust gases while also bonded to a wall of said explosion chamber so as to take a temperature between the average temperature of the gases and the average temperature of said wall, said sensor being also positioned in the explosion chamber in a zone generally farthest from the sparking plug and in which a knock phenomenon first occurs, and an electronic circuit for receiving a signal from said temperature sensor, said circuit comprising a threshold comparator which is capable of evaluating if the sensor temperature is below or above a preselected threshold value and of sending thus a command if said temperature exceeds said threshold value.

2. A device according to claim 1, characterized in that it comprises an alarming means in the form of a pilot lamp arranged on a dashboard in front of a driver's seat, said alarming means being actuated on the basis of the command sent from said electronic circuit as the temperature of said sensor exceeds said threshold value.

3. A device according to claim 1 characterized in that the preselected threshold value is variable as the engine number of revolutions is varied, the electronic circuit receiving, for example from the ignition system, signals which are significant of said number of revolution, said electronic circuit being thus capable of comparing the value of the sensor temperature with the threshold value corresponding to the number of revolutions at which the engine is running.

4. A device according to claim 1, characterized in that it comprises additional means which are an integral part of said electronic circuit and connected to said ignition system, said means being such as to effect a quick gradual decrease of the ignition advance relative to the basic adjustment as soon as the electronic circuit delivers a command when the temperature of said sensor exceeds the threshold value.

5. A device according to claims 3 or 4, characterized in that the quick gradual decrease of the ignition advance is effected concurrently in a more or less extended field of the basic adjustment.

6. A device according to claim 4, characterized in that said additional means, after having caused the quick gradual decrease of the ignition advance, are capable of discontinuing said decrease as soon as the sensor temperature drops below a second threshold value which is equal to, or lower than, said threshold value.

7. A device according to claim 4, characterized in that said additional means after having stopped said quick reduction of the ignition advance, command the start of a less quick gradual increase of the ignition advance towards the value which corresponds to the preselected basic adjustment.

* * * * *

UNITED STATES PATENT AND TRADEMARK OFFICE
CERTIFICATE OF CORRECTION

PATENT NO. : 4,265,205

DATED : May 5, 1981

INVENTOR(S) : Giampaolo Garcea

It is certified that error appears in the above-identified patent and that said Letters Patent are hereby corrected as shown below:

Column 4, line 53, before "2" insert -- Fig. --.

Column 6, line 11, renumber Claim 5 to be Claim 6 and change "3 or 4" to read -- 4 or 5 --.

Column 6, line 15, renumber Claim 6 to be Claim 5.

Signed and Sealed this

First Day of June 1982

[SEAL]

Attest:

GERALD J. MOSSINGHOFF

Attesting Officer

Commissioner of Patents and Trademarks